United States Patent [19]

Leone et al.

[11] Patent Number: 5,275,883

[45] Date of Patent: Jan. 4, 1994

[54] COMPOSITE MATERIAL THE CHARACTERISTICS OF WHICH CAN BE MODULATED BY PREIMPREGNATION OF A CONTINUOUS FIBER

[75] Inventors: Michel Leone, La Crau; Robert F. Carbone, La Garde; Roland A. Ganga, Joinville le Pont, all of France

[73] Assignees: Etat Francais; Atochem SA la Defense, both of France

[21] Appl. No.: 541,539

[22] Filed: Jun. 21, 1990

[30] Foreign Application Priority Data

Jun. 22, 1989 [FR] France .................................. 89 08312

[51] Int. Cl.$^5$ .................. D02G 3/00; B32B 15/00; B32B 9/00; B32B 27/36
[52] U.S. Cl. ................................. 428/373; 428/372; 428/379; 428/389; 428/367; 428/392; 428/394; 428/395; 428/74
[58] Field of Search ............... 428/372, 373, 379, 389, 428/367, 392, 394, 395

[56] References Cited

U.S. PATENT DOCUMENTS

| 4,614,678 | 9/1986 | Ganga | 428/367 |
| 4,713,139 | 12/1987 | Ganga | 428/367 |

FOREIGN PATENT DOCUMENTS

| 0303499 | 2/1989 | European Pat. Off. |
| 2566324 | 12/1985 | France |
| 2600585 | 12/1987 | France |

*Primary Examiner*—George F. Lesmes
*Assistant Examiner*—Kathryne E. Shelborne
*Attorney, Agent, or Firm*—Oliff & Berridge

[57] ABSTRACT

A composite material the characteristics of which can be modulated by preimpregnation of a continuous fiber.

It is characterized in that it is comprised of a sheath and a core consisting of continuous fibers, a powder and a filler the melting temperature of which is higher than at least the highest melting temperature of the other constituents of the material.

Applicable notably in the radioelectric fields and to radomes in particular.

21 Claims, 1 Drawing Sheet

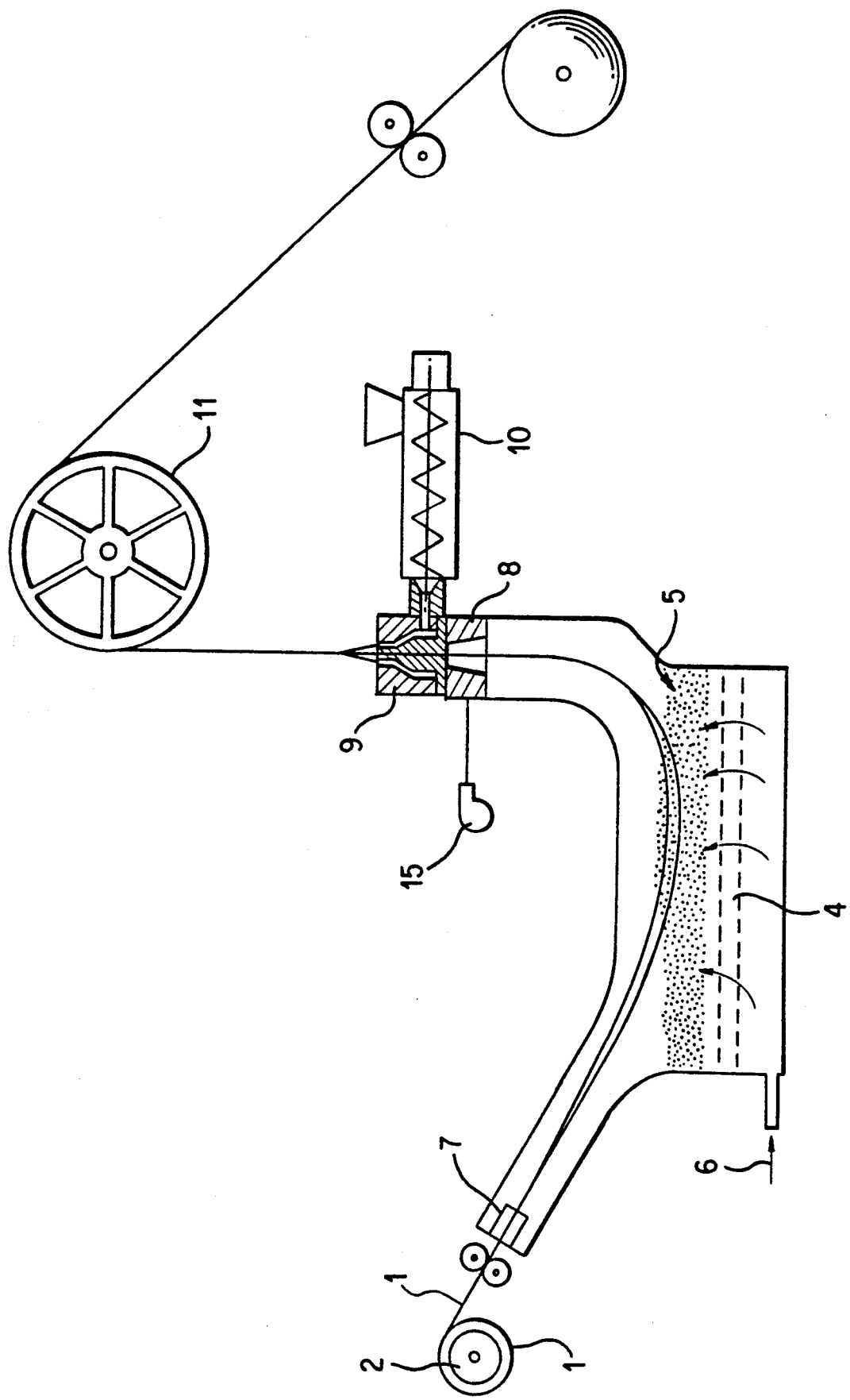

COMPOSITE MATERIAL THE CHARACTERISTICS OF WHICH CAN BE MODULATED BY PREIMPREGNATION OF A CONTINUOUS FIBER

This invention relates to a new composite material the characteristics of which can be modulated and which is obtained by preimpregnation of a continuous fiber.

Patent EP-0-133 825 has already described a flexible composite material comprising a flexible sheath covering a roving of fibers preimpregnated to the core with a fine powder of plastic material, the melting point of which powder being greater than or equal to that of the material of said flexible sheath so that, after the manufacture of the semi-product, it is possible to obtain a material which can be bent and even knotten without breaking and suitable for braiding, weaving and even knitting operations.

However, and whatever the nature of the powder utilized, it is not possible to change all the physical characteristics of the composite material beyond some limits. For that reason, the possible applications of said composite material remain limited and cannot, for example, be extended to the radioelectric fields.

Patent FR-A-2 566 324 has described a preimpregnated material comprising an outer metallic or plastic sheath and a core contained in said sheath, and including rovings in which, after opening, metallic powders are dispersed. It should be noted that the outer sheath, when made of a polymer, is eliminated by calcination before the melting of the metallic matrix.

Under these circumstances, the end product likely to be used industrially is in a condition wherein all or most of the rovings are not linked to one another; the characteristics of the so-obtained metallic product are thus comparable to those of metallic plates and/or pipes.

The aim of the present invention is to propose a new composite material comprising at least one continuous flexible outer sheath, continuous fibers contained in said outer sheath, with specific fillers accompanied with organic particles, made in the form of a continuous flexible thread in which all the present elements are not linked to one another, so that it is possible to manufacture semi-products in the form of a tape, a layer or a sleeve, the structure of which may be unidirectional, woven, knitted or multidirectional.

By varying the nature and/or the proportions of the various constituents of the composite material according to the invention, it is possible not only to vary the physical properties in each direction of the semi-product structure, but also to modulate the specific characteristics of the end product obtained from the semi-product, so as to suit them optimally to the intended application.

Other characteristics and advantages will appear clearly on reading the description of the composite according to the invention and the accompanying drawing in which the single FIGURE is an elevation and sectional view of an apparatus for preparing a mode of embodiment of a flexible thread.

The composite material according to the invention, which is preferably made in the form of a flexible thread obtained, for example, by means of the technique described in patent EP-0-1-338 825, comprises:

mineral, organic or metallic continuous fibers in the form of continuous multifilaments constituting rovings of different substances, a powder of adequate polymer, whether thermoplastic or thermosetting, specific solid, hollow or porous fillers which may consist of powders, balls, thin plates or fibrils, said fillers being mineral, organic or metallic and likely to have insulating, conducting and/or magnetic properties, and an outer sheath which, in most cases, is of the thermoplastic type, obtained by polymer extrusion, but which may be of a different nature and obtained, for example, by covering it with a web or dipping it in a solution and eliminating the solvent.

The characteristics of each constituent of the flexible thread such as chemical, mechanical or dielectric strength are selected according to the properties intended to be given to the end product.

A flexible thread manufacturing process consists in:

opening rovings of continuous fibers by running them on rollers or blowing an air jet, introducing the powder and the specific fillers into said open rovings, and then sheathing the fibers, the powder and the fillers which are not linked, by means of a continuous outer sheath.

The ratio by volume of the roving fibers to the powder and filler mixture is preferably in the 40 to 70% range and the ratio by weight of the sheath to the other thread constituents is in the 15 to 25% range.

It should be noted that the outer sheath is not also linked to the fibers and/or powder and fillers, for the thread to retain a great flexibility.

A process for manufacturing a flexible thread from the above-mentioned constituents may be as follows:

In a first phase, a mixture of powder and fillers is prepared, either by coating the filler with the powder, or by adding, according to the so-called "Dry Blend" process, filler grains around the powder grains or conversely. The ratio by volume of the mixture to the fillers and the powder is in the 90 to 0% range.

The grain structure of the polymer powder and specific filler grains is selected so that the powder/filler mixture can penetrate the filaments of continuous fibers. Preferably, the grain structure of the powder is in the 10 to 60$\mu$ range while that of the fillers is in the 0.2 to 100$\mu$ range.

A continuous roving of fibers (1) is unwound from feed reel (2) under traction created by a pair of guide rolls (3). Via a sealed air lock (7) the roving (1) enters a fully sealed fluidization chamber (4) where the mixture (5) is maintained in a state of fluidization by compressed air fed into the lower chamber. The roving (1) is spread out or opened by known means (not shown), such as rollers or splined cylinders. The roving becomes electrostatically charged by friction against these members and then, impregnated by the mixture, it is evacuated from the fluidization tank through a second sealed air lock (8).

The air lock (8) is specific in that it is mounted both to the fluidization tank and to the coating cross head (9) by means of two thermal seals (not shown) which allow maximum reduction of heat exchanges between the airlock (8) and both the coating cross head (9) which is a source of heat due to its positive heating (not shown), and the end of the fluidization tank (4). This heat insulation is intended to avoid the gelling of the mixture in contact with hot surfaces on which it might melt.

The tightness of the connections between the fluidization tank (4), the air lock (8) and the cross head (9) is intended to prevent the particles of powder and/or fillers from escaping outside the installation and causing accidents due to their ignition.

To supplement the back-flow by which any particle of the mixture not adhered to the roving by the electrostatic charge is returned to the tank, a light air current is generated in the air lock (8) by a low-volume pump (15). This pump is of the roller type as supplied to laboratories by the W.BACHOFEN Company of Basel. The air pressure provided by this pump is in the 0.10 to 0.30 bar range and the flow can be reduced to a minimum so as to generate a so-called "bubbling" air stream by reducing the speed of rotation of the roller rotor with which it is equipped and which creates the air displacement in a flexible hose closed by said roller rotor.

Small cyclone separators (not shown so as to simplify the FIGURE) allow the excess air introduced by the pump (15) to escape with recovery of the small quantities of mixture carried along by the air.

At the outlet of the air lock (8), the roving impregnated with the mixture enters the cross head (9).

The cross head (9) is fed with sheathing plastic material by the extruder (10) represented by its connection with the cross head. The plastic sheathing material leaves the cross head in a so-called "sleeving" form, that is the outlet diameter of the plastic sheath is determined by a mandrel with a diameter greater than the outer diameter of the roving. The sheath of molten material then shrinks due to the traction on the section leaving the die and comes into contact with the roving after a travel through the air of about 5 mm.

This coating cross head is advantageously positioned with a vertical axis. The section is virtually cold after a travel through the air of about one meter. It remains flexible and runs over a grooved pulley (11) which is about 600 mm in diameter.

In the case of high mixture densities, it is preferable to use a descending system instead of an ascending system as shown in the FIGURE.

During the manufacture of the flexible preimpregnated thread, its length characteristics can be modified by changing the nature and the grain structure of the mixture introduced into the open roving.

The so-obtained flexible thread with constant or variable length characteristics is used for manufacturing semi-products in the form of woven or knitted unidirectional structures, or multidirectional structures. The characteristics of the semi-products can be modulated by juxtaposing threads of different natures. So, it is possible to create a semi-product, or intermediate product, with patterns that can be varied in length, surface or thickness.

Another example of flexible thread consists in using a mixture wherein fillers are predominant and the outer sheath of which is covered with an appropriate preimpregnating resin compatible with the material used for manufacturing said sheath. The unidirectional, woven, knitted or multidirectional structures obtained with such thread are then impregnated with a resin.

Another example of a more complex flexible thread consists in using both a first sheath containing the continuous fibers, a powder or a powder-filler mixture, and a second sheath, identical with or different from the first sheath, the space between the two sheaths being filled by the fillers alone, a single powder or a second powder-filler mixture, the nature and/or the proportion of the elements of the second mixture being identical with or different from those of the first mixture.

It is obviously possible to manufacture a preimpregnated thread with more than two sheaths, the constituents disposed between the successive sheaths being selected according to the expected result.

The semi-product is transformed through the melting and/or cross-linkage of the sheath/mixture which links the fibers to the mixture so as to make up a composite end product. Generally, it is preferable to obtain this transformation through the combined action of temperature and pressure which depend on the materials utilized.

The characteristics specific to the materials, such as viscosity, crystallinity, length of the warp, melting and cooling or cross-linking times, are important factors in the manufacture of a good composite.

Known processes such as filament winding, pultrusion or pressing in an autoclave with projection of sectioned fibers can also be used.

The fields of application of the composite according to the invention are those of composite materials: structures, printed-circuit boards, electromagnetic windows, absorbing materials pertaining to the acoustic and electromagnetic fields.

The fibers are manufactured notably from E, R or S glass, aramid, silica, polymer or carbon fibers.

The powder is obtained from dielectric, thermoplastic, thermosetting, thermostable or absorbing polymers such as conductive or chiral polymers.

The fillers are, for example, solid or hollow balls made of silica, graphite, etc., or in the form of thin mineral or metallic plates or flakes having much sought after dielectric properties.

The sheaths are obtained in particular from thermoplastic polymers or ductile metals in the form of a film or a thread.

For the manufacture of electromagnetic windows, a flexible thread has been made, comprising:

a roving of 320 tex E glass fiber produced by Owens Corning Fiberglass, a mixture consisting of a dry blend of polyamid 12 "ORGASOL 2002" Nat with an average grain structure of 20 microns and hollow E 22/X glass balls with an average grain structure of 30 microns produced by the 3 M company; the percentage by volume of glass balls is 60% while that of the powder is 40%, a sheath made of AMNO polyamide produced by ATOCHEM, with a 1.06 density and a 40 melt index (measured at 190° under a 2 kg weight).

The flexible thread, obtained after passage through a fluidized bath and sheathing by extrusion, includes (by weight):

fibers: 60%
mixture: 23%
sheath: 17%

The so-obtained preimpregnated thread is arranged in parallel unidirectional threads in a mold heated up to 230° C. for 3 minutes; then it is pressed under 5 bars for 30 seconds and cooled in a press for 10 minutes. It is thus possible to obtain a specimen which, when tested, has a low dielectric permittivity and a low loss angle (Egδ).

What is claimed is:

1. A flexible composite material comprised of a sheath surrounding a core consisting essentially of continuous fibers the fiber being coated with a mixture of, a polymer powder which is transformable by a rise in temperature to form links with said fibers and said sheath, and a filler which is a hollow ball having a melting point which is greater than the highest melting point of all of the other components of said material.

2. The material as claimed in claim 1, wherein the nature of the filler is different from the nature of the powder.

3. The material as claimed in claim 1 wherein the filler is an organic, mineral or metallic filler.

4. The material as claimed in claim 3, wherein the filler has a grain structure in the 0.2 to 100 micron range.

5. The material as claimed in claim 3, wherein the fillers have a grain structure in the 10 to 60 micron range.

6. A material as claimed in claim 1, characterized in that the filler is an insulating, conducting or magnetic filler.

7. The material as claimed in claim 1, wherein the ratio by volume of the fillers to the powder is in the 90 to 0% range.

8. The material as claimed in claim 1, wherein the hollow ball is made of silica or graphite.

9. The material as claimed in claim 1, wherein the powder is a dielectric polymer.

10. The material as claimed in claim 9, wherein the powder has a grain structure in the 10 to 60 micron range.

11. The material as claimed in claim 1, wherein the powder is an absorbing polymer.

12. The material as claimed in claim 1, wherein the continuous fibers are glass, carbon, aramide or polymeric fibers.

13. The material as claimed in claim 1, wherein the continuous fibers are metallic fibers.

14. The material as claimed in claim 1, wherein the fibers are dielectric fibers.

15. The material as claimed in claim 1, wherein the ratio by volume of the fibers to a mixture consisting of the powder and the filler is in the 70 to 5% range.

16. The material as claimed in claim 1, wherein the sheath is a thermoplastic polymer.

17. The material as claimed in claim 1, wherein the sheath is made from a ductile metal.

18. The material as claimed in claim 17, wherein the ratio by weight of the sheath to the remainder of the material is in the 5 to 20% range.

19. The material as claimed in claim 17, the ratio by weight of the sheath to the remainder of the material is in the 5 to 70% range.

20. A product obtained from the material of claim 1, wherein it has radioelectric characteristics.

21. The material as claimed in claim 1, wherein the ratio by volume of the fibers to a mixture consisting of the powder and the filler is in the 70 to 30% range.

* * * * *